March 16, 1965  E. A. WAHL  3,173,583
BIN ACTIVATOR
Filed May 9, 1962  2 Sheets-Sheet 1
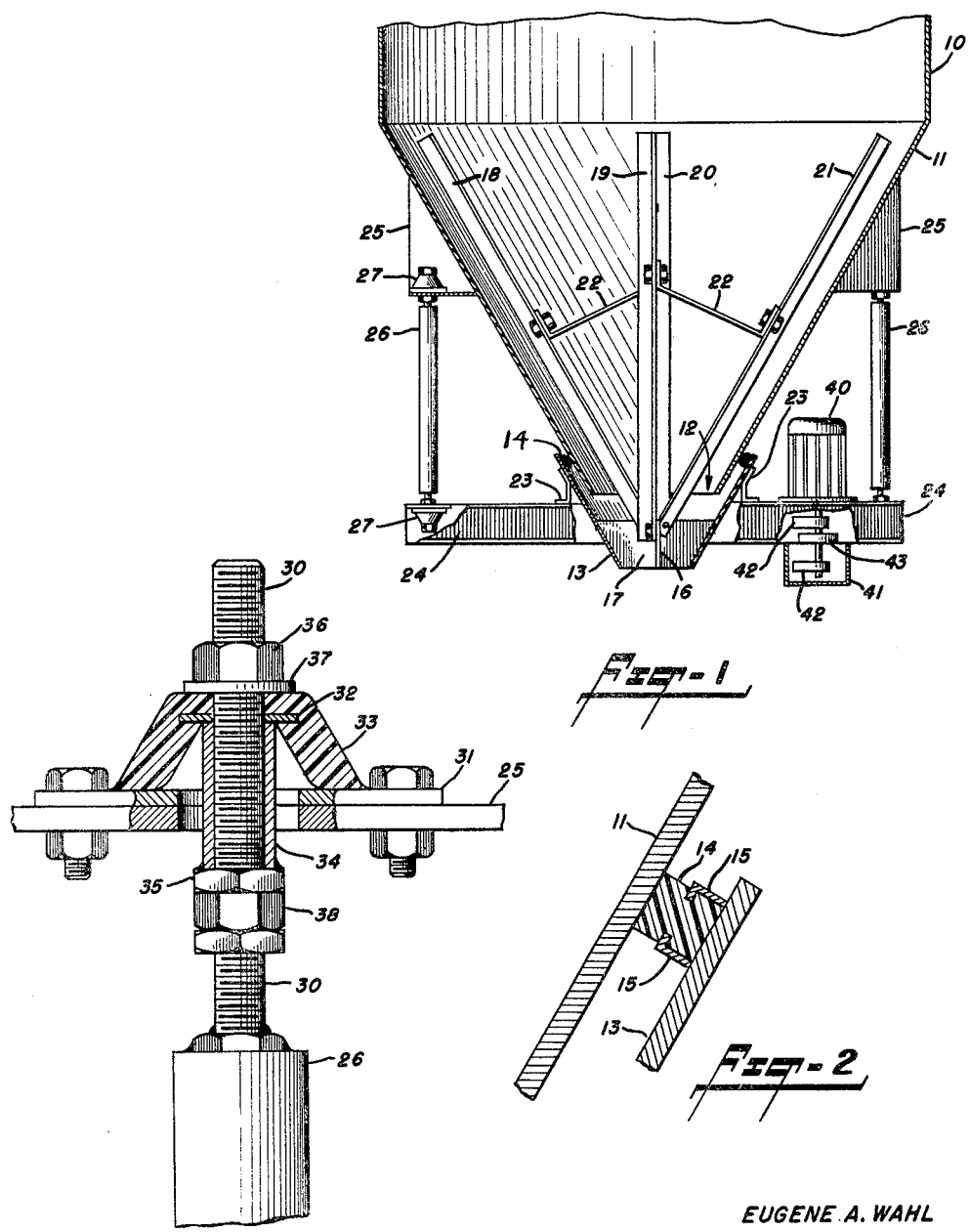
EUGENE A. WAHL
INVENTOR.
BY
ATTORNEY

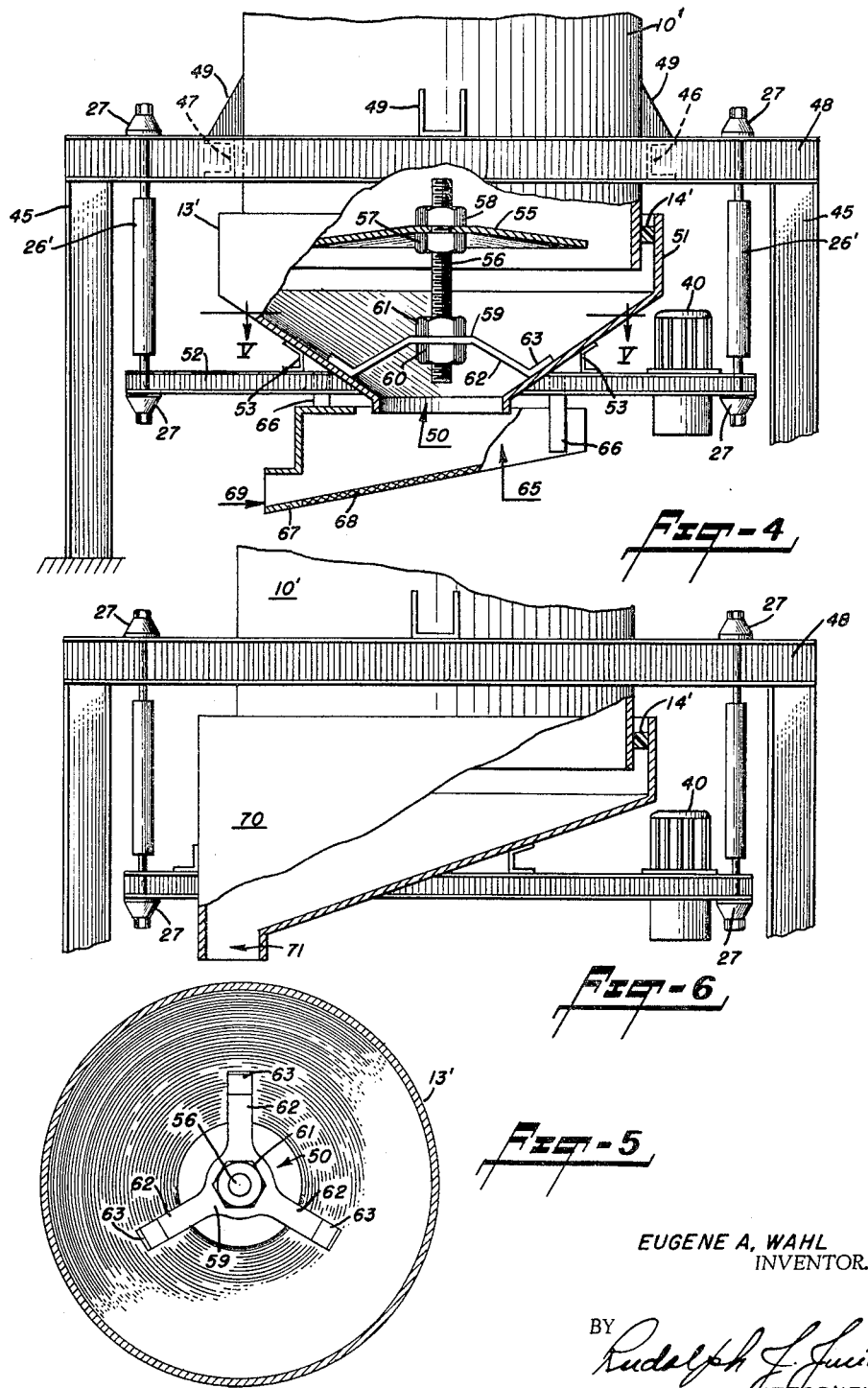

3,173,583
BIN ACTIVATOR
Eugene A. Wahl, 294 Forest Ave., Glen Ridge, N.J.
Filed May 9, 1962, Ser. No. 195,655
4 Claims. (Cl. 222—199)

This invention relates to apparatus for use in conjunction with a storage bin, or hopper, and more particularly to activator apparatus adapted for attachment to a storage bin to promote the flow of material therefrom.

The present application is a continuation-in-part application of my prior-filed application, serial Number 185,017, filed April 4, 1962, which prior application has now been abandoned.

A common problem encountered in the handling of powdered, granular, pulverized, or the like material, is the positive and continuous feeding of such material from a storage bin, or hopper, since the material being handled often sticks to portions of the hopper wall and/or bridges within the hopper. Conventional means for inducing the flow of material from such hoppers includes external vibrating devices,, internal pulsating air pads lining the hopper walls, mechanically-driven rotating agitators, and the like. Rotating agitators generally are impractical on hoppers of large size because of the difficulty of agitating large masses of powdered or granular material. Also, while vibration of the hopper serves to promote the discharge of some materials, it has been found that, in the case of materials of a sticky character, simple external vibration of the hopper will not prevent the sticking and bridging of such materials. The structural mass and rigidity of the hopper limits the amount of vibration that can be transmitted through the hopper walls and into and through the material contained therein.

The present invention overcomes the shortcomings of prior apparatus of this class by means of a novel vibration and material-agitating means effective at critical points where material sticking and/or bridging normally occurs. Further, the apparatus is adapted for attachment to existing hoppers thereby providing obvious economy as well as effecting a positive, continuous flow of the material from the hopper opening.

An object of this invention is the provision of improved apparatus for use with a storage bin, or hopper, to promote a positive discharge of the contained material through the hopper discharge opening.

An object of this invention is the provision of apparatus adapted for attachment to an existing storage hopper, which apparatus includes means for imparting vibratory agitation to the contained material, particularly in the region of the hopper discharge opening, thereby providing for the positive flow of the material from the hopper.

An object of this invention is the provision of apparatus for promoting the flow of material from a storage hopper having a discharge opening at the lower end thereof, which apparatus comprises a material-receiving member having sloping walls terminating in a material-dispensing opening, means vibratorily suspending the material-receiving member in alignment with the hopper discharge opening, means for vibrating the material-receiving member in a plane predominantly normal to the axis thereof, and means for imparting such vibrations to the contained material in the region of the hopper discharge opening.

An object of this invention is the provision of a novel bin activator arrangement for attachment to a storage bin having converging lower walls terminating in a discharge opening, which apparatus includes a discharge member complementary to the hopper discharge opening, a diverging framework secured to the said member and extending in spaced relation along the hopper walls and means for vibrating the said member and framework in a plane predominantly normal to the hopper axis.

An object of this invention is the provision of apparatus for agitating material contained in a storage hopper, which apparatus includes means for applying relatively high amplitude vibrations at the hopper discharge opening and in a plane normal to the hopper axis, and means for imparting such vibrations to the contained material.

These and other objects and advantages will become apparent from the following description when taken with the accompanying drawings, illustrating several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is, essentially, a central, vertical, cross-sectional view of apparatus made in accordance with one embodiment of this invention;

FIGURE 2 is an enlarged, fragmentary, cross-sectional view showing the sealing ring which closes the space between the hopper wall and the material-receiving member;

FIGURE 3 is a fragmentary view, drawn to an enlarged scale, and showing the vibration-isolation mounting by means of which the apparatus is suspended from the hopper;

FIGURE 4 is, essentially, a side view, with parts broken away and in cross-section, showing another embodiment of the invention;

FIGURE 5 is a cross-sectional view taken along the line V—V of FIGURE 4; and

FIGURE 6 is a fragmentary view showing a vibratory, material-receiving member of different shape.

Referring, now, particularly to FIGURE 1, there is shown a storage hopper, or bin, 10 having an inclined lower wall 11 terminating in a normal discharge opening 12. In this particular case, the hopper is cylindrical and the bottom portion is conical, a type of construction presently in wide use. It will be apparent, however, that the hopper, including the bottom portion, may be of other shape as, for example, of generally square cross section. The apparatus forming the basis of this invention comprises a conical, material-receiving member 13 telescopically positioned over the lower conical section of the hopper, with a clearance area between the member and the proximate outer wall of the hopper. Such clearance area is sealed by a circular rubber ring, or gasket 14. As best seen in FIGURE 2, the sealing ring 14 is retained in position by complementary circular clamping rings 15, welded, or otherwise secured, to the conical member 13.

Welded to the conical member 13 and across the mouth thereof are two, vertical cross plates 16 and 17 disposed at right angles to each other. Four angle bars, or arms 18-21, spaced 90 degrees apart and extending in spaced relation along the inner wall of the hopper, have their lower ends bolted to the vertical cross plates. These arms are tied together, by suitable cross bars 22, to provide a rigid structure with a minimum of interference to the downward flow of material. Such cross bar arrangement is particularly adapted for use with relatively small hoppers. In the case of large hoppers, the four angle arms are tied together by a solid, conical baffle plate which plate blocks the downward flow of material along the center portion of the hopper, thereby reducing the head load of the material and preventing a possible undesirable compacting of the material at the hopper discharge opening. This, however, does not effect the continuous flow of material from the hopper, since the apex of the conical baffle is uppermost and the material flows along the surface of the baffle and between the divergently-disposed angle arms on its way to the hopper bottom.

The conical member 13 is rigidly secured to horizontal channel beams by means of the brackets 23, which brackets are welded to the conical member and the beams. Four channel beams are welded together to form a rigid, open frame, the forward such beam 24 being visible in the FIGURE 1 view. These channel beams are suspended from four brackets 25, which are welded to the hopper outer wall, by means of four column members 26. Each bracket includes an integral, horizontally-extending arm provided with a hole and each column member is connected to the associated bracket and channel beam by vibration mounts identified by the numerals 27. Such mounting arrangement is shown in detail in FIGURE 3 to which reference is now made.

A threaded stud 30 extends axially from the upper end of the column member 26 and is secured thereto by welding. The stud passes through aligned clearance holes formed in the mounting bracket 25 and the base plate 31 of the vibration mount, the latter being bolted to the mounting bracket, as shown. A steel washer 32 is molded into the rubber member 33, which member is permanently secured to the base plate 31. This washer is provided with a central hole for the stud 30 and abuts against the upper surface of a spacer tube 34 which surrounds the stud and has its lower end welded to a nut 35. An upper adjusting nut 36 abuts against a washer 37 and a lower adjusting nut 38 abuts against the nut 35. It will be apparent that the mechanical coupling of the column member 26 to the mounting bracket 25 (which is welded to the external surface of the hopper) is through the rubber member 33.

Referring back to FIGURE 1, inasmuch as similar vibration mounts are used at each end of each of the four columns, it will be apparent that the entire assembly, comprising the channel beams 24, the conical member 13 and the angle arms 18–21 is free to vibrate as a parallelogram suspended on four columns. Orbital vibrations, in a plane predominantly normal to the hopper axis, are produced by means of an electric motor 40, which is securely mounted on one of the channel beams 24. The motor has a shaft extending into a gyrator housing 41 which shaft has keyed thereto a plurality of eccentrically-mounted weights 42 disposed on opposite sides of a bearing 43 that is secured to the beam. The center of mass of each weight preferably is displaced from the shaft axis in the same direction whereby rotation of the motor shaft imparts a transverse vibration to the channel beam structure, which vibration is transmitted to the conical member 13 and the diverging arms 18–21. The described arrangement of the weights provides a maximum thrust. However, it will be apparent that the weights may be oriented relative to each other so as to provide a lesser thrust.

In operation, the motor, operating at any speed, preferably 1200–1800 r.p.m., rotates the eccentric weights and accordingly gyrates the framework at this frequency. I have found that a vibration amplitude of approximately 1/8 inch will provide for the free, positive flow of materials which heretofore have created troublesome hoppering problems. In an actual test, the bin activator apparatus was applied to a tall, narrow hopper having only a 45 degree conical bottom to exaggerate the problem of bridging and sticking of the material. The outlet opening of the conical member 13 was only 4" in diameter and the test material was wet sand. With the outlet open to the full 4" diameter, a continuous, rapidly-flowing, four inch stream of material was discharged from the hopper. The outlet was then reduced to 1/8 inch diameter and, again, a continuous, 1/8 inch diameter stream of the wet sand flowed freely from the hopper. The apparatus was then operated for a period of time with the outlet completely closed, yet, there was no packing of the material within the hopper. Immediately upon opening the outlet, a full flow of material resumed. With the outlet fully open and the apparatus shut off, the flow of material from the hopper stopped completely.

Although the apparatus shown in FIGURE 1 includes four, diverging arms extending into the hopper, a greater or lesser number of such arms may be used, depending upon the configuration of the hopper bottom and the particular material contained therein. The size and shape of the conical material-receiving member 13 conforms, generally, to the size and shape of the bottom portion of the particular hopper. Generally, the bin activator apparatus shown in FIGURE 1 is designed for attachment to an existing hopper. Located and arranged as shown, the conical member and the attached arms produce vibration of the material at the critical points, namely, at the hopper bottom and the discharge opening.

Reference, now, is made to FIGURE 4 which illustrates another embodiment of the invention. Here, the hopper 10' has a uniform diameter throughout its axial length and is supported above ground by four legs 45 in the form of channel beams. Secured to the legs is a channel beam framework consisting of two cross beams 46, 47 joined to spaced, longitudinal beams of which the forward beam 48 is visible in the drawing. U-shaped bracket arms 49 are welded to the hopper wall and to the horizontal channel beams. The material-receiving member 13', of the bin activator apparatus, has a conical central portion terminating in a material-discharge opening 50 on one end and a cylindrical portion 51 at the other end. Such cylindrical portion is telescopically disposed over the lower end of the hopper and the clearance space is closed by a rubber sealing ring 14'. The member 13' is rigidly secured to the open, channel beam framework 52 by brackets 53, which framework is vibratorily suspended from the upper channel beams by four column members 26' through the vibration mounts 27. The apparatus described to this point will provide a positive flow of most materials from the hopper upon energization of the motor 40.

In certain applications as, for example, where the clearance between ground and the material discharge member 13' must be a maximum and the particular material is of an extremely sticky character, the central portion of the member 13' may have an angle of less than 15 degrees from horizontal. In such case, to assure a positive discharge of the material from the relatively flat member 13', an internal baffle-vibrator arrangement may be desirable. Toward this end, a circular baffle member 55, preferably of dish-shape, is adjustably secured to a threaded rod 56 by means of the nuts 57, 58. The lower end of the rod passes through a central hole formed in a spider 59 and is adjustably secured thereto by the nuts 60, 61 (see also FIGURE 5, which is a cross-sectional view taken along the line V—V of FIGURE 4). The arms 62, of the spider, have offset free ends 63, which are welded to the inner surface of the conical member 13'. It will be apparent that the material contained within the member 13' is subject to intense vibration through the medium of the member 13'. On the other hand, the simultaneous vibration of the baffle 55, which is positioned within the hopper proper, will prevent a possible bridging of the material at this point. When used, the baffle 55 may be utilized to set the rate of material flow from the hopper to the material-receiving member, it being apparent that the passageway for such material flow is the circular opening between the baffle periphery and the hopper wall. Further, and particularly in the case of relatively long hoppers, the baffle reduces the head load of the material in the material-receiving chamber, thereby preventing a possible undesirable compacting of the material.

In many hoppering operations, it is desirable to screen out oversize particles and/or foreign matter. An arrangement for this purpose can readily be provided on bin activator apparatus made in accordance with this invention. A generally square, or circular receptacle 65 is securely attached to the apparatus as by four straps 66. Such receptacle has an opening formed in the top wall, for receiving the material which flows out of the discharge opening 50, and a sloping bottom wall 67, the major portion of which is a screen 68 of appropriate mesh. Inasmuch as the receptacle is vibrated along with the rest of the apparatus, the material will pass freely through the screen whereas the oversize particles will move along the screen and pass out of the gate 69.

In the bin activator apparatus shown in FIGURES 1 and 4, the vibratable material-receiving members, which effectively form a separate discharge opening for the hopper, are conical and are provided with a central discharge outlet. It is apparent that such material-receiving members may have other shapes to meet specific requirements in the field. As shown in FIGURE 6, the material-receiving member 70 has a sloping bottom terminating in a material discharge outlet 71 at one side.

In the FIGURE 1 embodiment of the invention, the hopper has a conical bottom portion of considerable axial length and the four rigid arms, also having a substantial length, are provided to vibrate the material thereby to promote a positive flow of the material from the conical hopper portion to the vibratable material-receiving member 13. On the other hand, in the FIGURE 4 embodiment of the invention, the discharge opening of the hopper is of a maximum diameter so that, generally, there is no problem of movement of the material from the hopper to the material-receiving member. Consequently, such material-receiving member can be relatively shallow. However, it will be apparent that, in either case, the entire material-receiving member, which forms a separate bottom portion of the bin, is vibrated thereby activating all of the material contained therein and assuring a positive, outward flow of the material. One practical advantage of the FIGURE 4 construction lies in the fact that the entire bin activator apparatus is a unitary assembly which can be installed on a hopper from the bottom. Consequently, such apparatus can be shipped from the factory as an assembled unit so that the user need only suspend the activator from the supporting structure of the particular bin.

The provision of a separate, material-receiving member secured to a suspended, vibratable framework obviates the need to vibrate the hopper per se and/or the use of complex apparatus within the hopper, to promote the downward flow of material therein. This affords economy of manufacture and assembly, a maximum flexibility of use, and smooth, trouble-free operation with materials which heretofore presented serious hoppering difficulties.

Obviously, the specific configuration of the material-receiving member can be conical, square, rectangular or etc., to conform to a particular hopper shape. Further, the discharge outlet of the material-receiving member can be provided with a closure means to prevent the discharge of certain materials when the bin activator apparatus is not in operation. Also, such discharge outlet may be provided with means for manually adjusting the effective opening thereof thereby to provide a desired rate of flow of the material.

Having now described the invention in detail, those skilled in this art will be able to make various changes and modifications to adapt the invention to specific uses. Changes of this character are intended to fall within the spirit and scope of the invention as recited in the following claims.

I claim:

1. Apparatus for promoting the flow of material from a vertically-disposed storage bin having a discharge opening at the bottom, which apparatus comprises, (a) a generally-conical, material-receiving member having an inlet opening corresponding substantially to that of the bin discharge opening and a truncated apex forming an outlet opening, (b) means vibrationally supporting the conical member in a vertical position with the wall portion forming the inlet spaced from the opening bin wall, (c) material-agitating means spaced from the inner wall of the conical member and rigidly secured thereto, said agitating means being disposed within said conical member and extending substantially to the said inlet opening thereof, and (d) means vigorously vibrating the conical member.

2. The invention as recited in claim 1, wherein the means vibrating the conical member is a gyrator secured to the conical member, said gyrator comprising an eccentrically-mounted weight rotatable by an electric motor.

3. The invention as recited in claim 2, wherein the material-agitating means includes a baffle member disposed in the region of the bin discharge opening, said baffle member lyng substantially in a plane normal to the axis of the conical member and having a peripheral surface spaced from the inner wall of the conical member.

4. The invention as recited in claim 2, wherein the material-agitating means includes an inverted conical baffle member disposed in the region of the bin discharge opening and having a peripheral surface spaced from the inner wall of the conical member, and wherein the eccentrically-mounted weight rotates in a plane substantially normal to the axis of the conical member.

References Cited in the file of this patent

UNITED STATES PATENTS

| 1,783,423 | Harper | Dec. 2, 1930 |
| 1,984,651 | Meves | Dec. 18, 1934 |
| 2,044,326 | Pickell | June 16, 1936 |
| 2,433,684 | Damond | Dec. 30, 1947 |
| 2,729,362 | Hughes | Jan. 3, 1956 |
| 3,012,697 | Rouse et al. | Dec. 12, 1961 |

FOREIGN PATENTS

| 244,227 | Italy | July 28, 1926 |

Disclaimer 3,173,583.—*Eugene A. Wahl*, Glen Ridge, N.J. BIN ACTIVATOR. Patent dated Mar. 16, 1965. Disclaimer filed May 24, 1976, by the inventor.
Hereby enters this disclaimer to claims 1 and 2 of said patent.
[*Official Gazette August 17, 1976.*]